United States Patent [19]

Premerlani et al.

[11] Patent Number: 5,555,367
[45] Date of Patent: Sep. 10, 1996

[54] METHOD AND SYSTEM FOR GENERATING COMPUTER PROGRAMS FOR QUERIES FORMED BY MANIPULATING OBJECT-ORIENTED DIAGRAMS

[75] Inventors: William J. Premerlani, Scotia, N.Y.; Michael R. Blaha, Chesterfield, Mo.; James E. Rumbaugh; Robert M. Salemme, both of Schenectady, N.Y.

[73] Assignee: General Electric Company, Schenectady, N.Y.

[21] Appl. No.: 315,514

[22] Filed: Sep. 30, 1994

[51] Int. Cl.$^6$ .................................................. G06F 3/14
[52] U.S. Cl. .................... 395/161; 395/600; 395/700; 395/650
[58] Field of Search ........................ 395/161, 500, 395/600, 650, 700, 800; 364/401

[56] References Cited

U.S. PATENT DOCUMENTS

| | | | |
|---|---|---|---|
| 5,206,951 | 4/1993 | Khoyi et al. | 395/650 |
| 5,261,080 | 11/1993 | Khoyi et al. | 395/500 |
| 5,303,379 | 11/1994 | Khoyi et al. | 395/700 |
| 5,369,778 | 11/1994 | San Soucie et al. | 395/800 |
| 5,421,012 | 5/1995 | Khoyi et al. | 395/650 |

OTHER PUBLICATIONS

"An Object-Oriented Relational Database" by William J. Premerlani, et al, Communications of the ACM, Nov. 1990, vol. 33, No. 11, pp. 99–109.

"A Graphical Data Manipulation Language for an Extended Entity-Relationship Model" by Bogdan Czejdo, et al, 1990 IEEE–Computer, pp. 26–36.

"Graphical Query Formulation for an Entity-Relationship Model" by DW Embley, et al, Data & Knowledge Engineering, vol. 2, No. 2, Jun. 1987, pp. 89–121.

*Primary Examiner*—Mark R. Powell
*Assistant Examiner*—Ruay Lian Ho
*Attorney, Agent, or Firm*—David C. Goldman; Marvin Snyder

[57] ABSTRACT

A method and system for generating computer programs for queries by manipulating an object-oriented diagram. In the present invention, a query is specified for the object diagram. A series of transformations are performed on the object classes within the object diagram in accordance with the query. A revised object diagram representative of the query is then produced. Computer code is then automatically generated for the query from the revised object diagram. The code is used to prototype programs that query and/or update data stored in a database.

18 Claims, 11 Drawing Sheets

Generated query code:

oa_Set<FlightLegDescription*>direct_flights=
(FlightLegDescription::extent)
[:this->origin->airport_code==origin_code &
this->destination->airport_code==destioation_code:]

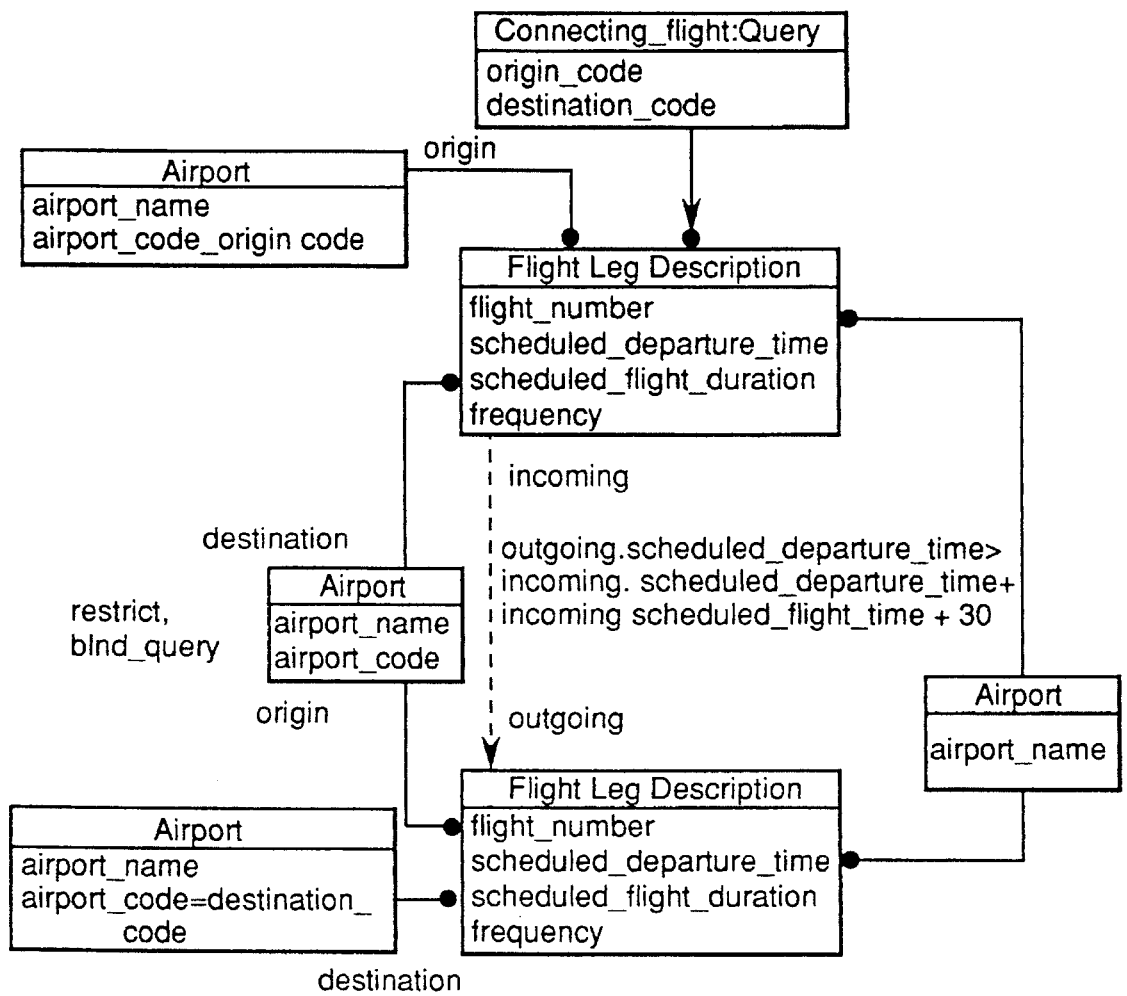

Generated query code:

```
os_Set<FlightLegDescription*>incomings, outgoings, connecting_flights;
FlightLegDescription*incoming;
FlightLegDescription*outgoing;
Incomings=
(Airport::extent)[%airport_code+destination_code%].
destinationFlightLegDescriptions;
Outgoings=
(Airport::extent)[%airport_code=origin_code%].originFlightLeg Descriptions;
Connecting_flights.clear( );
foreach(incoming, incomings)
foreach(outgoing, outgoings)
If(incoming->destination==outgoing->origin &&
   incoming->airline==outgoing->airline &&
   outgoing,scheduled_departure_time>
   incoming,scheduled_departure_time+
   incoming,scheduled_departure_time+30) connecting_flights.insert(incoming);
```

FIG. 8c

METHOD AND SYSTEM FOR GENERATING COMPUTER PROGRAMS FOR QUERIES FORMED BY MANIPULATING OBJECT-ORIENTED DIAGRAMS

BACKGROUND OF THE INVENTION

The present invention relates generally to object-oriented diagrams, and more particularly to generating computer programs for queries formed by manipulating the object-oriented diagrams.

Object-oriented diagrams are often used to describe data structures within a database. The data structures are typically the target of various operations, such as database queries and updates, as well as object-oriented language operations. These operations are implemented by using a query. A query is a set of commands that specify a condition and retrieve information from the database that matches the condition set by the query. A query is specified by a query language which enables the retrieval and display of data from the database. Typical relational query languages are used to perform complicated searches that match conditions such as equal to, not equal to, greater than, greater than or equal to, less than, less than or equal to, range equal, and range not equal.

Another type of operation that is frequently implemented by a query language is a join which is a database table operation that creates a resultant entry in another table (temporary) for each entry in one table whose key field matches that of an entry in the other. An inner join and an outer join are two types join operators. The inner join when applied to two existing relations (tables), produces a third table that consists of all possible ordered joinings of records from the first table with records from the second for which certain specified criteria on the data values from the two tables are met. An outer join performs an extended join operation in which the rows in one relational table than have no counterpart in the second relational table appear in the resulting relation table with all null values.

Presently, there are several types of query languages in use. One of the most commonly used query languages for implementing database operations is a structured query language (SQL), which expresses the query as a sequence of statements. The process of expressing the query in SQL is tedious and error prone. In particular, SQL requires typing hundreds of lines of complicated commands that typically take a very long time to type and usually are accompanied with errors. Another type of query is an object-oriented language programming interface, which is described in Premerlani et al., "An Object-Oriented Relational Database," *Communications of the ACM* (November 1990), Vol. 33, No. 11, pp. 99–109. Although the object-oriented language programming interface provides a better interface than SQL, the programmer must still type the query, which is subject to syntactic and semantic errors. Language sensitive editors can provide some relief from certain types of errors, but the keyboard is still a bottle neck as with SQL. Still another type of query language is a query by example (QBE), which is a fill in the blanks approach to questioning a database. The QBE approach also requires a lot of typing and does not provide an object-oriented expression of the query. Another type of query language is a natural language interface, which allows a user to question a database in free-form English. In order to translate the user's English question into a request for information from the database, natural language interfaces contain a specialized vocabulary and rules for putting together queries using the vocabulary. The natural language interface also requires a lot of typing and does not provide an object-oriented expression of the query.

Queries formulated from graphical interfaces have been used to overcome the drawbacks associated with the above-approaches, which use a keyboard to formulate the query. An example of a graphical interface used to formulate a query is disclosed in Czejdo et al., "A Graphical Data Manipulation Language for an Extended Entity-Relationship Model," *Computer*, March 1990, pp. 26–36. Czejdo et al. interactively queries a database via operations on an object diagram, but is unable to automatically generate computer code that can be integrated into another program to execute the query operations. Although the graphical interface described in Czejdo et al. may be sufficient to formulate a query for an application developer, it is very difficult for an application user to formulate a query in view of the many problems associated with expressing a query. Thus, there is a need to automatically generate the computer code from the object-oriented diagram.

SUMMARY OF THE INVENTION

Therefore, it is a primary objective of the present invention to provide a method and system for automatically generating computer programs for queries formed by manipulating object-oriented diagrams.

Another object of the present invention is to improve programmer productivity and reduce errors in coding database query and update operations.

Still another object of the present invention is provide a method and system for prototyping programs that query and/or update data that is stored in a database.

In the present invention, computer code for the computer programs is automatically generated by graphically manipulating an object-oriented diagram. In particular, additional functionality has been added to existing graphical software tools. In the preferred embodiment, additional menu selections have been added to OMTool™, a graphical software tool sold by Martin Marietta. The additional menu selections enable a user to interactively query a database via operations on an object-oriented diagram and automatically generate computer code for the query. The present invention has the advantage over conventional approaches in that syntactic or semantic errors are not present.

Thus, in accordance with the present invention, there is provided a method for generating computer programs for queries formed by manipulating an object diagram. The object diagram models various relationships between object classes and their attributes in the diagram. The method includes specifying a query for the object diagram. Next, a series of transformations are performed on the object classes within the object diagram in accordance with the query. Then a revised object diagram representative of the query is produced. A code for the query is automatically generated from the revised object diagram.

Also, in accordance with the present invention, there is provided a system for generating computer programs for queries formed from an object diagram. The system comprises a computer processor; a database coupled to the computer processor for storing data; interface means coupled to the computer processor for inputting, retrieving, and manipulating data in the database; and tooling means responsive to the interface means for producing the object diagram. The tooling means includes a specifying means for specifying a query for the object diagram. A performing means performs a series of transformations on the object classes within the object diagram in accordance with the query. A producing means produces a revised object diagram representative of the query. A code generating means automatically generates a code for the query from the revised object diagram.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIGS. 8a–8c show a second example illustrating the present invention.

DETAILED DESCRIPTION OF THE PRESENT INVENTION

Figure 1:
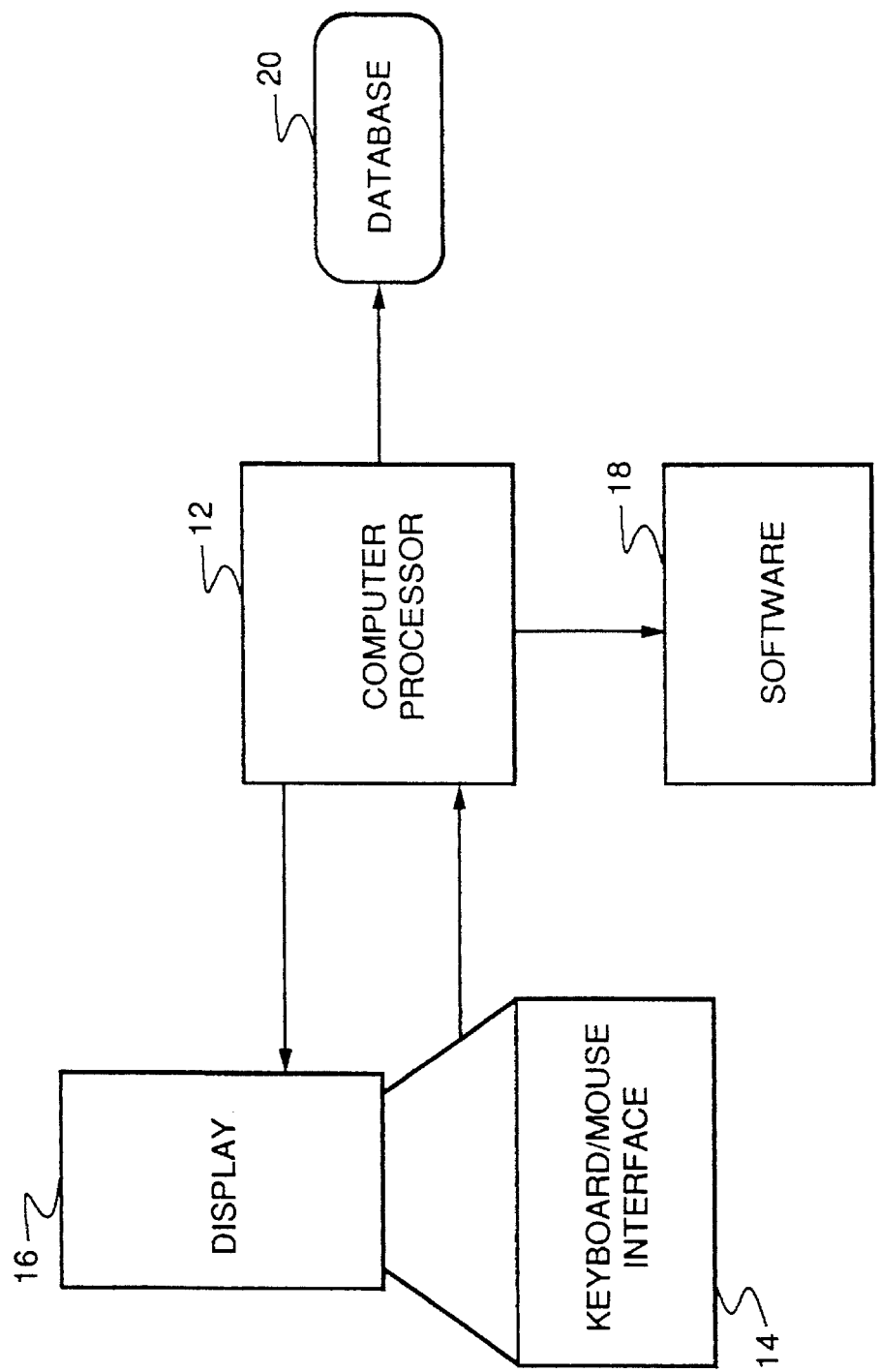
FIG. 1 is a block diagram of the system used in the present invention.

FIG. 1 shows a block diagram of the system 10 used in the present invention. The system includes a computer processor 12 such as a personal computer or the like with a keyboard/mouse interface 14 and a display 16. The computer processor is controlled by software 18 having an operating system, application programs, and various utility programs. In addition, the present invention which is described below is embodied in the software 18. The computer processor inputs and retrieves data from a database 20 via a bidirectional path and outputs the data to the display 16.

Figure 2:
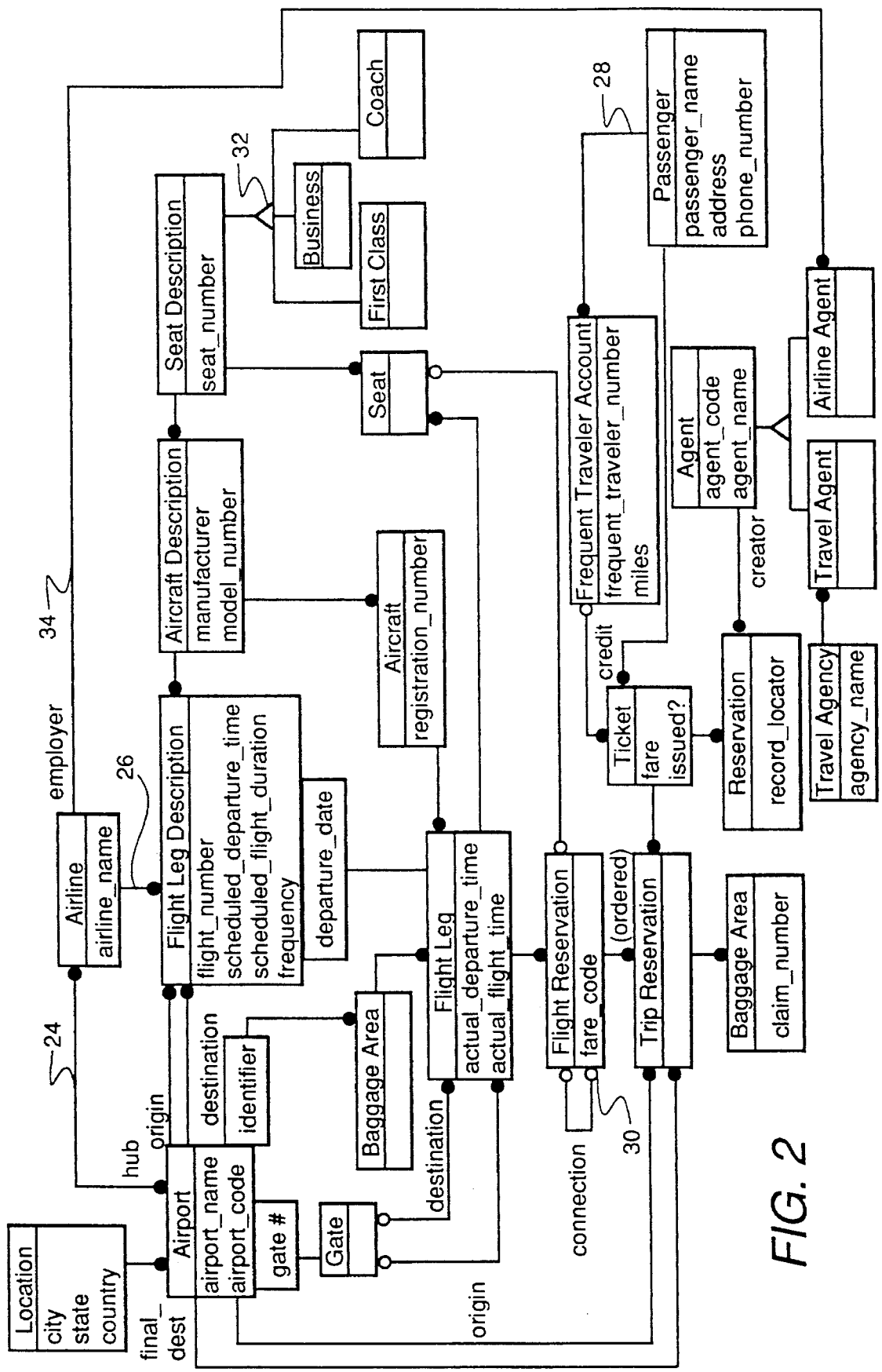
FIG. 2 an example of an object-oriented diagram using OMTool™.

In the present invention, object-oriented diagrams are created and edited by using graphical software such as OMTool™. Although the preferred embodiment will be described in conjunction with OMTool™, the present invention can be used with other graphical software tools such as Paradigm Plus™ and Software-Through-Picture's IDE™. An object-oriented diagram created by using OMTool™ describes data structures in a particular system. In particular, the object-oriented diagram describes objects and their data attributes and their operation, and relationships to other objects. An example of an object-oriented diagram is shown in FIG. 2. The object-oriented diagram in FIG. 2 describes the data structures that could be used to obtain airline reservations. The basic object-oriented diagram element is an object class 22, which provides a description of a set of objects having a common structure and behavior. In OMTool™, the object class is drawn as a box with two sections. The top section contains the name of the object class. The bottom section contains a list of attributes which are data values for the object class. In FIG. 2, some of the object classes are location, airline, airport, agent, etc., and some of the attributes are city, airport_name, departure_date, seat_number, etc. The object classes can be related in many different forms by relationships which are portrayed in the object diagram with lines 24 between the object boxes. Symbols at one or both extremities of a relationship line reflect how many objects of one object class are associated with each object of another class. A line ending with a solid circle 26 means many (i.e. zero or more); a line ending without a symbol 28 means exactly one; and a line ending in a circle 30 means zero or one. There are four types of relationships, generalization, aggregation, association, and qualified association. Generalization 32 segregates an object class into subclasses and is designated by using a triangle symbol. An aggregation is an assembly-component or a part of relationship and is designated by a diamond symbol (not-shown). An association 34 is a relationship of two or more independent objects and is designated by a line. A qualified association uses a qualifier as an attribute and is represented by a box.

Figure 3:
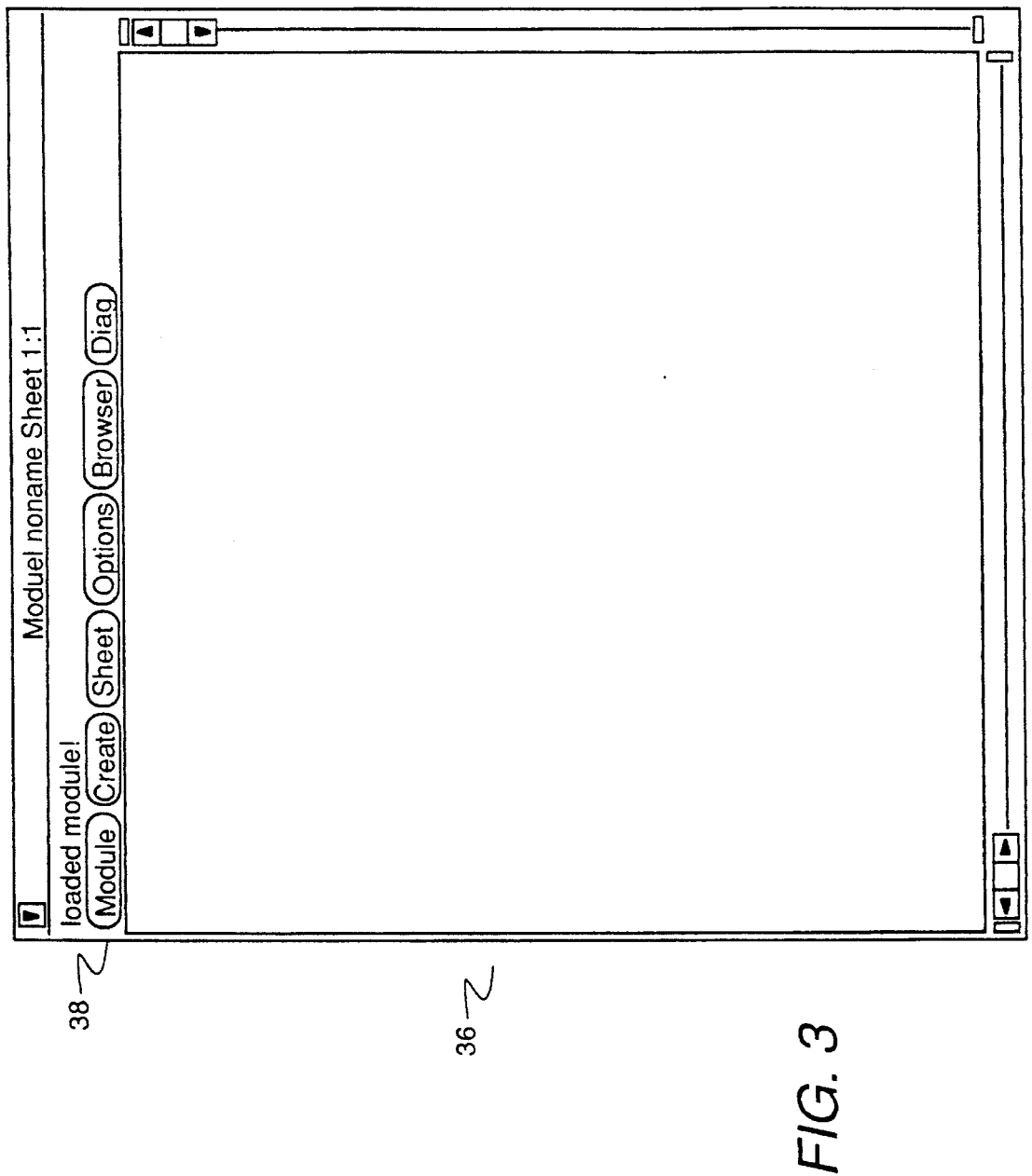
FIG. 3 is an illustration of an OMTool™ opening screen.
Figure 4:
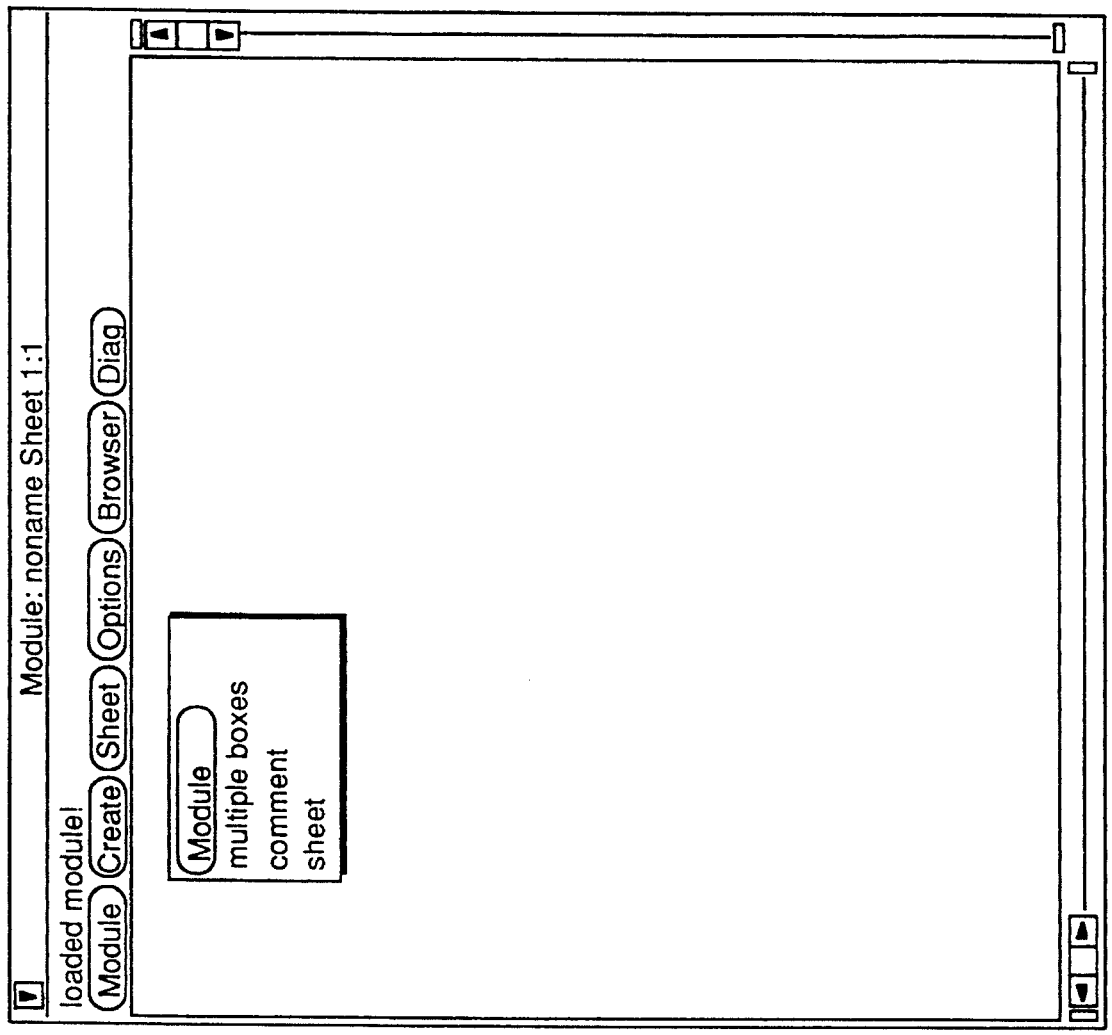
FIG. 4 is an illustration of an OMTool™ create menu.
Figure 5:
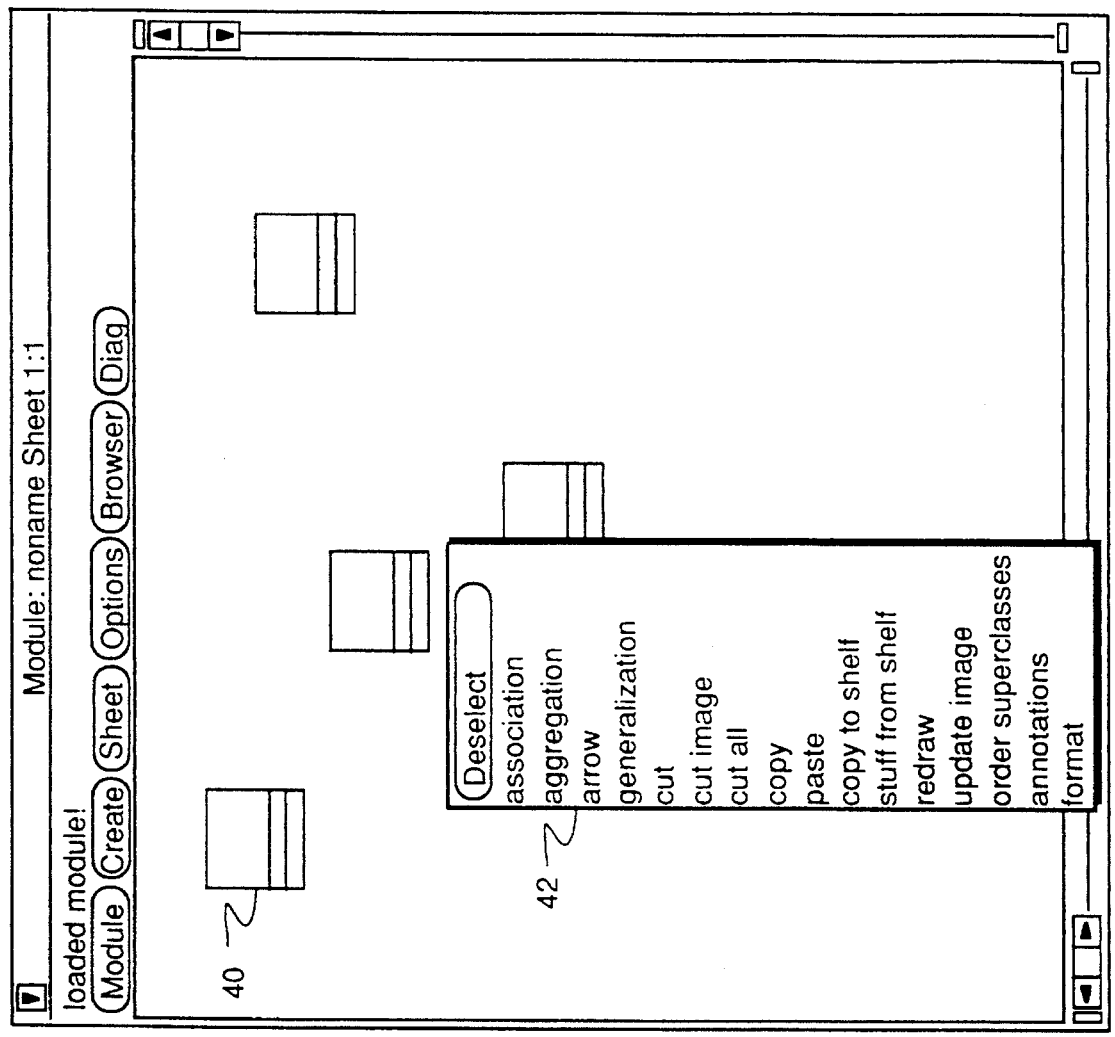
FIG. 5 is an illustration of object boxes created with OMTool™.

An object-oriented diagram is created by using the keyboard/mouse interface 14. In particular, the mouse is used to access the OMTool™ program. An opening screen 36 is shown in FIG. 3. At the top of the screen are several pull-down menus 38 which are accessed by the mouse. In order to create object classes, the mouse is moved to the create menu and object boxes are created by selecting single or multiple boxes as illustrated in FIG. 4. After making a selection, the mouse is used to move the created box(es) to a desired position on the screen. FIG. 5 provides an illustration of object boxes 40 that are located at various positions on the screen. Information is entered in each box by first selecting the box with the mouse and the typing the information with the keyboard. Relationships between the object classes are developed by using commands on a pop-up menu 42. In particular, a relationship is selected for an object class by first highlighting the object class with the mouse and accessing the pop-menu and the desired relationship. After selecting the relationship, the mouse is used to connect the relationship to the desired object classes. An example of a completed object-oriented diagram is shown in FIG. 2. Other features of OMTool™ are disclosed in the OMTool User Guide 1.0, June 1992, which is incorporated herein by reference.

Figure 6:
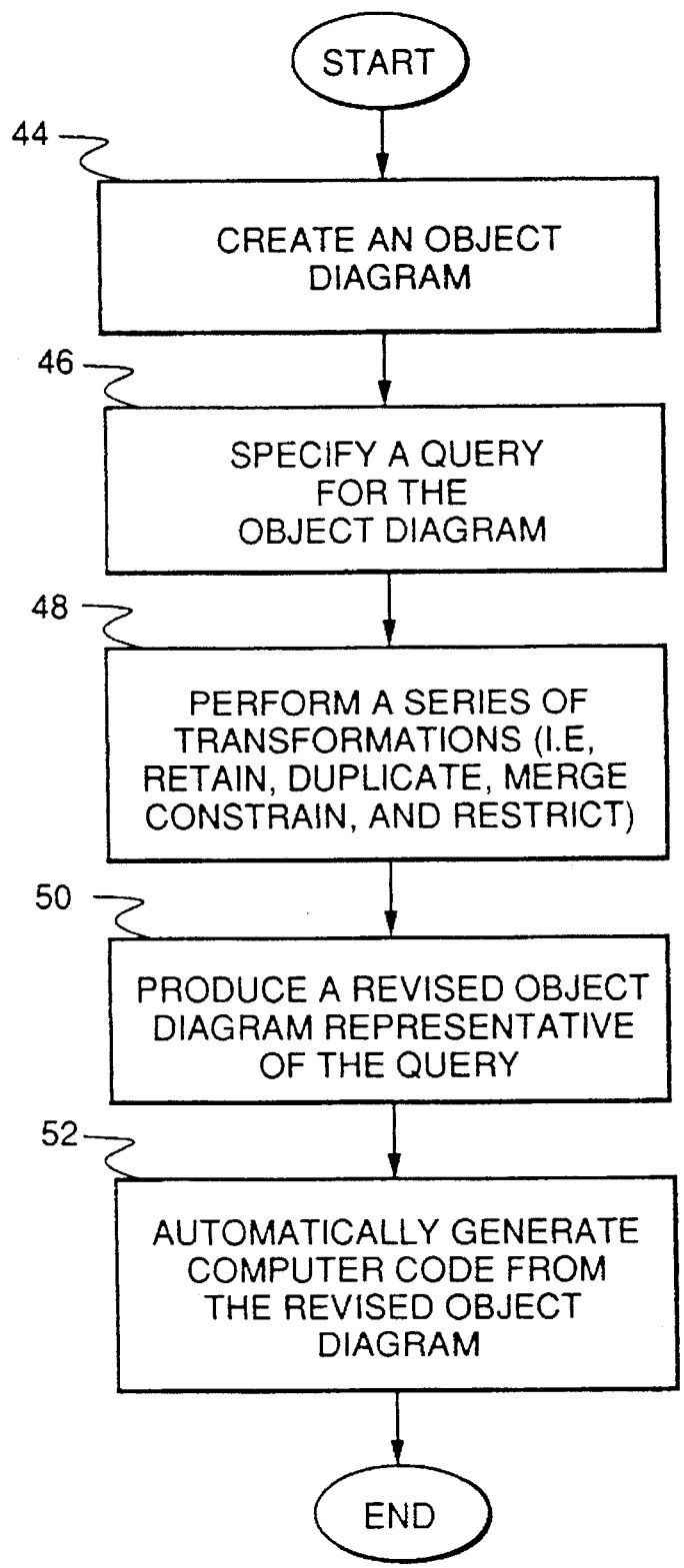
FIG. 6 is a flow chart describing the operation of the present invention.

The present invention is an extension of OMTool™ that provides additional functionality such as additional operations on the menu selections. The present invention is described in reference to the flow chart set forth in FIG. 6. At 44, an object-oriented diagram is created using the above-mentioned approach. The object-oriented diagram models a particular data structure within a database. A query is specified for the object diagram at 46. At 48, a series of transformations (i.e., retain, duplicate, merge, constrain, restrict, and bind) are performed on the object model by using the mouse. The transformations are additional operations that can be added to OMTool™. The transformations are applied to the object model to produce a revised object model at 50 that represents the query. The transformed model is a specification for the Cartesian product of instances of classes and links of associations in the transformed model, with only those combinations of instances and links that satisfy the following conditions:

all instances and links in a combination satisfy all constraints and restrictions specified in the transformed model;

each instance in a combination has a link in the same combination for each association in which it plays a role in the transformed model; and each link in a combination links instances in the same combination.

The basic operations for transforming the model to a query representation are retain, duplicate, merge, constrain, bind, and restrict. The retain operation retains only the selected classes and associations. Unselected classes and associations are removed from the model. The duplicate operation duplicates the selected classes and associations. The merge operation combines copies of the same class, when two or more copies of the same class are selected. The constrain operation expresses a constraint between instances of two selected classes. The restrict operation expresses a condition that an attribute of a class should satisfy. After the revised object diagram has been produced, the inputs and output of the specified query is bound to program variables so that computer code can be automatically generated at 52. In the present invention, the preferred computer code is Object Store™ but any other object-oriented language is within the realm of the invention. With the present invention, there is no need to type the code because it is done automatically, resulting in no syntactic or semantic errors. After the code has been generated, it can be prototyped to access and update data stored in the database.

Figure 7A:
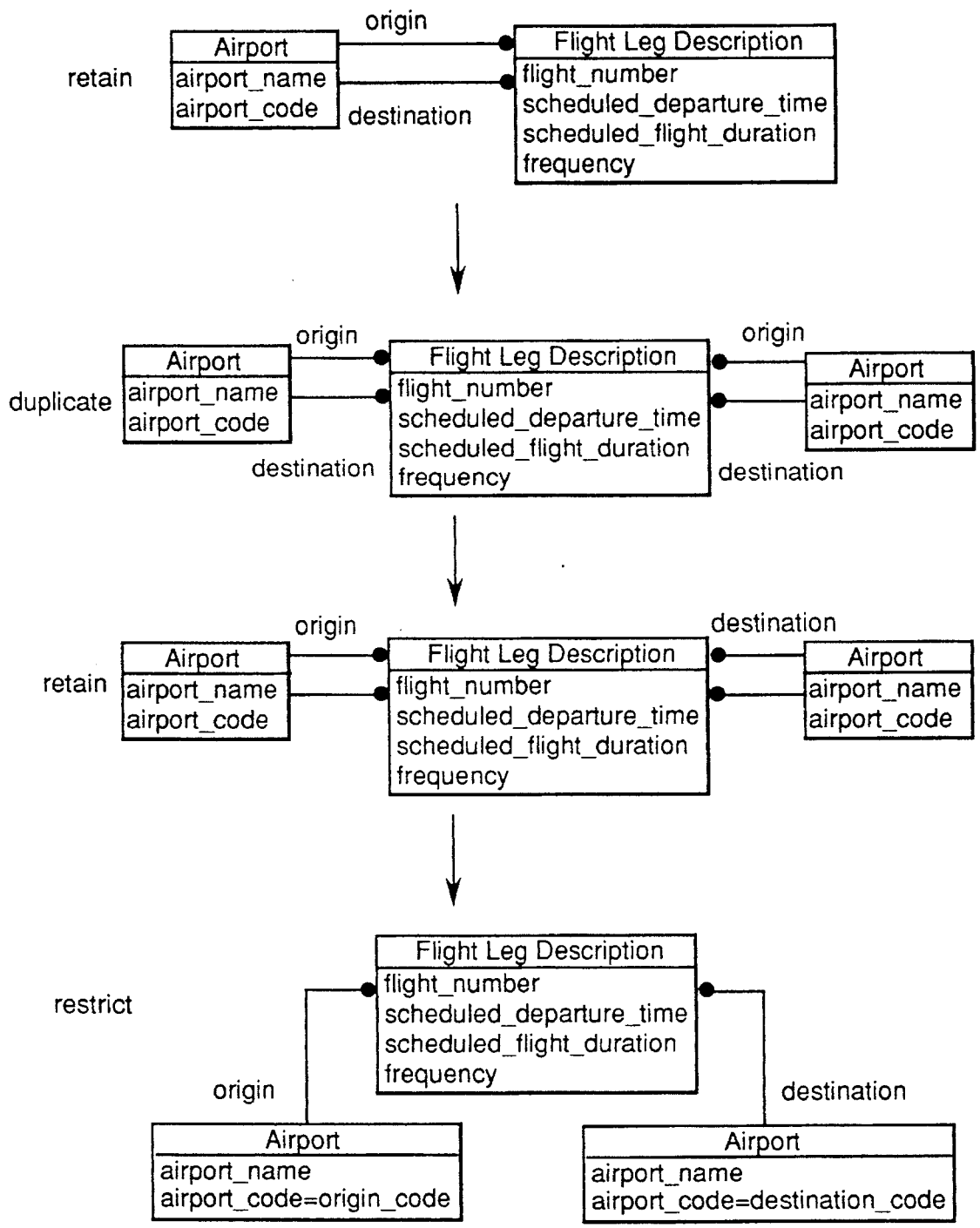
FIGS. 7a–7c show an example illustrating the present invention.
Figures 7B, 7C:
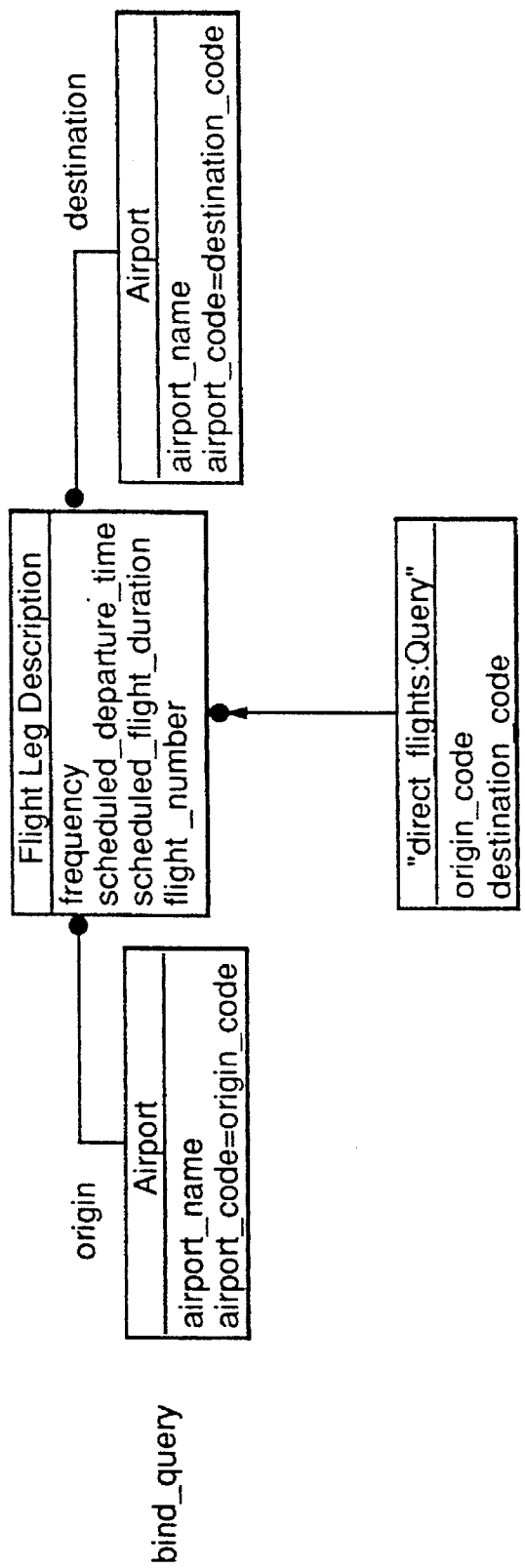

An example of how no use the present invention is described in reference to FIG. 2 and FIGS. 7a–7c. If in FIG. 2, the specified query for the object model is given airport origin, destination, find FlightLegDescriptions, direct flight, any airline. In this example, the first transformation that would be performed is a "retain" to retain only the selected classes and associations (see FIG. 7a). Since Airport and FlightLegDescription are the only classes in the specified query, these classes will be retained and the remainder are removed. Since the flight has an origin and a destination, the Airport class has to be duplicated to have both origin and destination. Also, since both Airport classes can be only either an origin or a destination, a "retain" operation is used. The next transformation is a "restrict" that express the conditions that the attributes in each class should satisfy. In FIG. 7b, the query is binded, so that only direct flights from a certain origin to a specific destination is pulled out. The code is then be generated and an example is shown FIG. 7c.

Figure 8A:
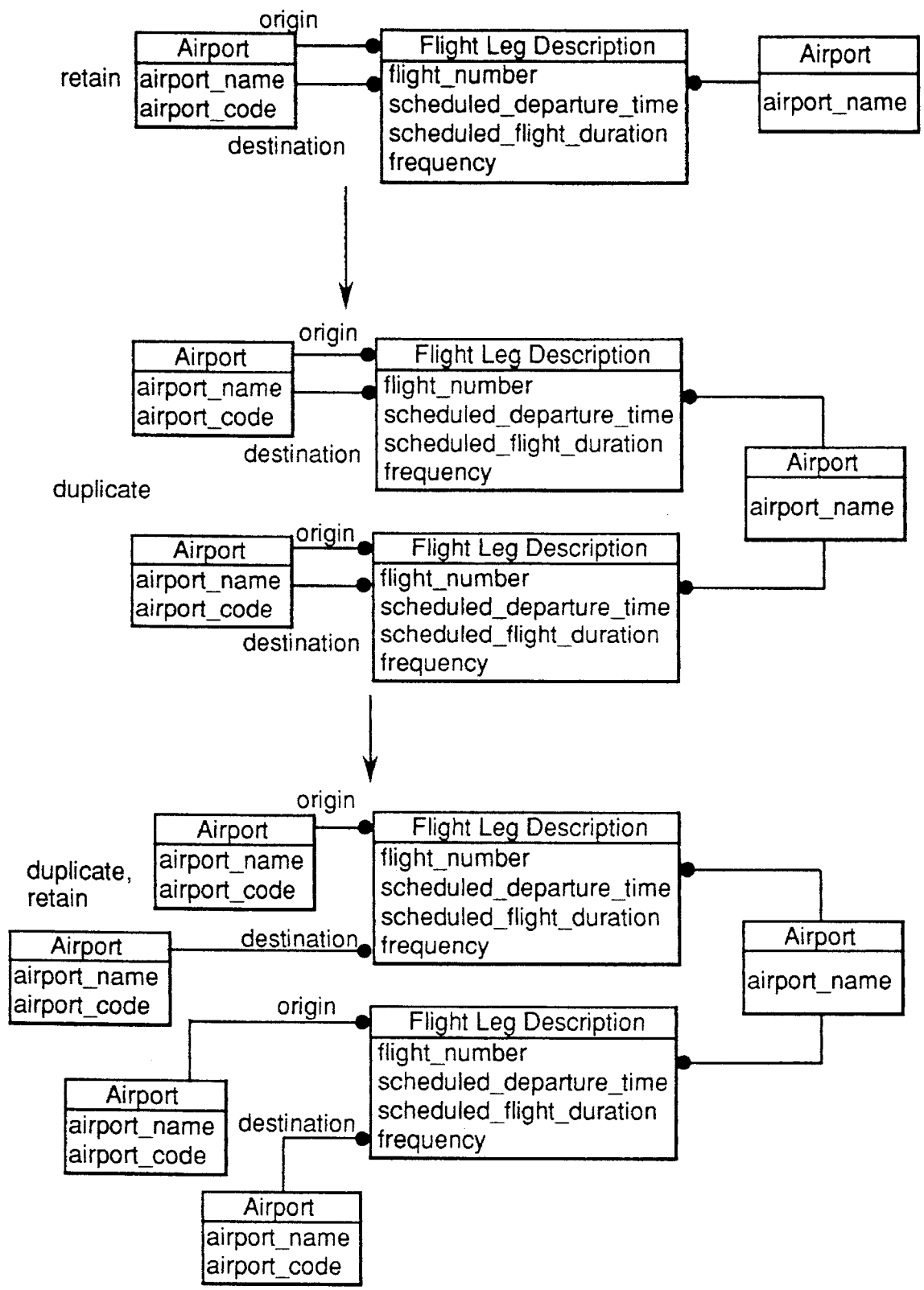
Figure 8B:
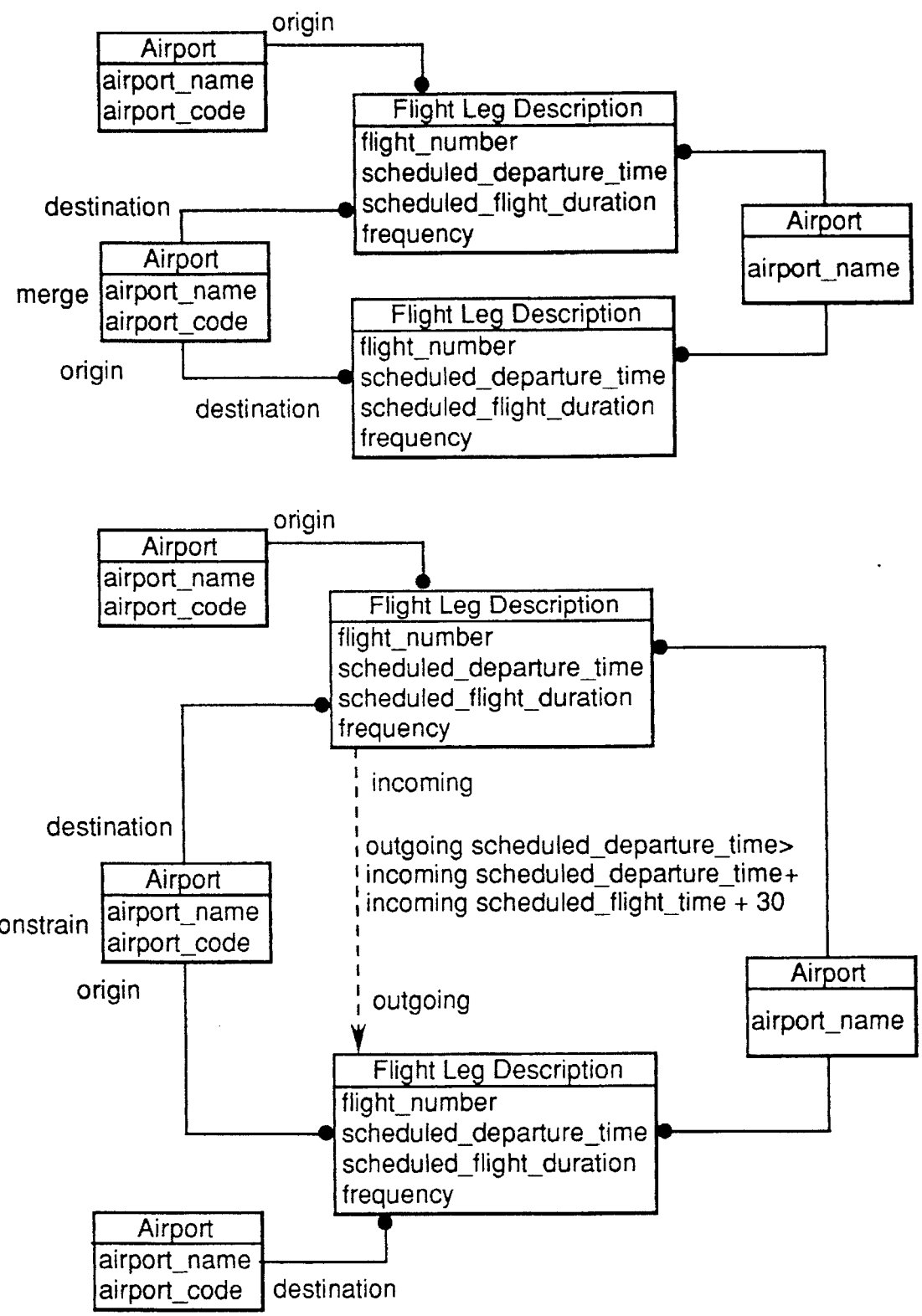

Another example of how to use the present invention is illustrated in FIGS. 8a–8c with reference to FIG. 2. If in FIG. 2, the specified query for the object model is given two airports, find two flight legs with a 30 minute connection, on any airline. In this example, the first transformation that is performed is a "retain" to retain only the selected classes and associations (see FIG. 8a). Since Airport, FlightLegDescription, and Airline are the only classes in the specified query, these classes are "retained" and the remaining classes are removed from FIG. 2. Since the flight has an origin and a destination, the Airport class has to be "duplicated" to have both origin and destination. Also, since the flight has connection, another Airport class has to be duplicated. In addition, a FlightLegDescription is needed for the airport classes, so a "duplicate" transformation is performed. Since two of the Airport classes can be either an origin or a destination, a "retain" operation is used. The next transformations shown in FIGS. 8b are a "merge" and a "constrain". In FIG. 8c, the query is binded, and the code is generated.

The above examples illustrate the operation of the present invention and are not meant to limit the invention to these operations described therein. Instead the present invention can be used in a variety of applications with a variety of transformations. In particular, the transformations can be applied in any order and should not be limited to the order described in the examples.

It is therefore apparent that there has been provided in accordance with the present invention, a method and system that generates computer programs for queries derived by manipulating an object-oriented diagram that fully satisfy the aims, advantages and objectives hereinbefore set forth. The invention has been described with reference to several embodiments, however, it will be appreciated that variations and modifications can be effected by a person of ordinary skill in the art without departing from the scope of the invention.

We claim:

1. A computer-implemented method for generating a computer program that specifies a query for extracting data from a database, the method comprising the steps of:

creating an object-oriented diagram describing data structures within the database as object classes and providing a representation of relationships between each of the object classes;

interpreting the object-oriented diagram as specifying a subset of all object instances of the object classes that satisfy constraints implied by the relationships in the object-oriented diagram;

performing a series of transformations on the object classes within the object-oriented diagram to further specify conditions of the query;

producing a revised object-oriented diagram representative of the query; and automatically generating a code for the query from the revised object-oriented diagram.

2. A method according to claim 1, wherein the step of performing a series of transformation includes operations such as retain, duplicate, merge, constrain, and restrict.

3. A method according to claim 2, wherein the retain operation retains classes and associations that are to be included in the specification of the query.

4. A method according to claim 2, wherein the duplicate operation includes duplicating classes and associations that specify the query.

5. A method according to claim 2, wherein the merge operation includes combining copies of the same classes, when two or more copies of the same class specify the query.

6. A method according to claim 2, wherein the constrain operation includes expressing a constraint between instances of two specified classes from the query.

7. A method according to claim 2, wherein the restrict operation includes expressing a condition that an attribute of class will satisfy.

8. A method according to claim 1, further comprising the step of prototyping the generated code for accessing and updating data stored in a database.

9. A computer-implemented method for generating a computer program that specifies a query for extracting data from a database, the method comprising the steps of:

creating an object-oriented diagram describing data structures within the database as object classes and providing a representation of relationships between each of the object classes;

interpreting the object-oriented diagram as specifying a subset of all object instances of the object classes that satisfy constraints implied by the relationships in the object-oriented diagram;

performing a series of transformations on the object classes within the object-oriented diagram to further specify conditions of the query;

producing a revised object-oriented diagram representative of the query;

automatically generating a code for the query from the revised object-oriented diagram; and prototyping the generated code for accessing and updating data stored in the database.

10. A system for generating a computer program that specifies a query for extracting data from a database, the system comprising:

a computer processor;

a database coupled to the computer processor for storing data;

interface means coupled to the computer processor for inputting, retrieving, and manipulating data in the database; and tooling means responsive to the interface means for producing the object-oriented diagram describing data structures within the database as object classes and providing a representation of relationships between each of the object classes, the tooling means further comprising means for interpreting the object-oriented diagram as specifying a subset of all object instances of the object classes that satisfy constraints implied by the relationships in the object-oriented diagram; means for performing a series of transformations on the object classes within the object-oriented diagram to further specify conditions of the query; means for producing a revised object-oriented diagram representative of the query; and means for automatically generating a code for the query from the revised object-oriented diagram.

11. A system according to claim 10, wherein the a series of transformation performed in the performing means includes operations such as retain, duplicate, merge, constrain, and restrict.

12. A system according to claim 11, wherein the retain operation retains classes and associations that are to be included in the specification of the query.

13. A system according to claim 11, wherein the duplicate operation includes duplicating classes and associations that specify the query.

14. A system according to claim 11, wherein the merge operation includes combining copies of the same classes, when two or more copies of the same class specify the query.

15. A system according to claim 11, wherein the constrain operation includes expressing a constraint between instances of two specified classes from the query.

16. A system according to claim 11, wherein the restrict operation includes expressing a condition that an attribute of class will satisfy.

17. A system according to claim 11, further comprising means for prototyping the generated code for accessing and updating data stored in a database.

18. A system for generating a computer program that specifies a query for extracting data from a database, the system comprising:

a computer processor;

a database coupled to the computer processor for storing data;

interface means coupled to the computer processor for inputting, retrieving, and manipulating data in the database; and tooling means responsive to the interface means for producing the object-oriented diagram describing data structures within the database as object classes and providing a representation of relationships between each of the object classes, the tooling means further comprising means for interpreting the object-oriented diagram as specifying a subset of all object instances of the object classes that satisfy constraints implied by the relationships in the object-oriented diagram; means for performing a series of transformations on the object classes within the object-oriented diagram to further specify conditions of the query; means for producing a revised object-oriented diagram representative of the query; means for automatically generating a code for the query from the revised object-oriented diagram; and means for prototyping the generated code for accessing and updating data stored in the database.

* * * * *